(12) United States Patent
Shana'a et al.

(10) Patent No.: US 9,071,283 B2
(45) Date of Patent: Jun. 30, 2015

(54) METHOD FOR CONTROLLING A MODULATION INDEX OF A NEAR FIELD COMMUNICATION DEVICE WITH AID OF DYNAMIC CALIBRATION, AND ASSOCIATED APPARATUS

(71) Applicant: MediaTek Singapore Pte. Ltd., Singapore (SG)

(72) Inventors: Osama K A Shana'a, Singapore (SG); Eng-Chuan Low, Singapore (SG); Tieng Ying Choke, Singapore (SG); Chin-Heng Leow, Singapore (SG); Yuan Sun, Singapore (SG)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/040,722

(22) Filed: Sep. 29, 2013

(65) Prior Publication Data
US 2014/0323041 A1 Oct. 30, 2014

Related U.S. Application Data

(60) Provisional application No. 61/816,953, filed on Apr. 29, 2013.

(51) Int. Cl.
*H04B 5/00* (2006.01)

(52) U.S. Cl.
CPC .................................. *H04B 5/0031* (2013.01)

(58) Field of Classification Search
USPC ........ 455/423, 425, 41.1, 41.2, 42, 44, 67.11, 455/67.13, 67.14, 68, 69; 340/13.24, 13.25, 340/13.26, 10.1, 10.4, 10.5
See application file for complete search history.

(56) References Cited

U.S. PATENT DOCUMENTS

| | | | | |
|---|---|---|---|---|
| 6,167,236 A | * | 12/2000 | Kaiser et al. | 455/41.1 |
| 6,882,826 B2 | * | 4/2005 | Hediger et al. | 455/41.1 |
| 7,439,800 B2 | * | 10/2008 | Conraux | 329/347 |
| 7,907,005 B2 | * | 3/2011 | Kranabenter | 329/311 |
| 8,115,604 B2 | * | 2/2012 | Ryoo et al. | 340/10.51 |
| 8,150,321 B2 | * | 4/2012 | Winter et al. | 455/41.2 |
| 8,559,872 B2 | * | 10/2013 | Butler | 455/41.1 |
| 8,581,705 B2 | * | 11/2013 | Stewart | 340/10.34 |
| 8,847,735 B2 | * | 9/2014 | Gay et al. | 340/10.1 |
| 8,914,061 B2 | * | 12/2014 | Charrat et al. | 455/552.1 |
| 2011/0243277 A1 | * | 10/2011 | Noel | 375/334 |
| 2014/0073241 A1 | * | 3/2014 | Luong et al. | 455/41.1 |
| 2014/0086301 A1 | * | 3/2014 | Akhavan et al. | 375/238 |

* cited by examiner

*Primary Examiner* — Tuan A Tran
(74) *Attorney, Agent, or Firm* — Winston Hsu; Scott Margo

(57) ABSTRACT

A method for controlling a modulation index of a near field communication (NFC) device includes: in a calibration mode of the NFC device, temporarily coupling a receiver of the NFC device to a transmitter of the NFC device to form a probing path between the receiver and the transmitter; and in the calibration mode of the NFC device, dynamically adjusting at least one portion of a plurality of modulation parameters corresponding to the modulation index according to probed results of outputs of the transmitter, in order to calibrate the modulation index, for use of transmitting through the transmitter in a normal mode of the NFC device. An associated apparatus is also provided.

20 Claims, 6 Drawing Sheets

METHOD FOR CONTROLLING A MODULATION INDEX OF A NEAR FIELD COMMUNICATION DEVICE WITH AID OF DYNAMIC CALIBRATION, AND ASSOCIATED APPARATUS

CROSS REFERENCE TO RELATED APPLICATIONS

This application claims the benefit of U.S. Provisional Application No. 61/816,953, which was filed on Apr. 29, 2013, and is included herein by reference.

BACKGROUND

The present invention relates to dynamic modulation index calibration for near field communication (NFC) devices, and more particularly, to a method for controlling a modulation index of an NFC device, and to an associated apparatus.

According to the related art, a conventional NFC device can be designed to communicate using a predetermined ASK data rate. In practice, it is typically needed to make sure of a proper value of the modulation index in advance (e.g., in a design phase of the conventional NFC device, or during manufacturing the conventional NFC device), in order to achieve better performance of the conventional NFC device. As the modulation index depends on many factors such as the antenna size of the conventional NFC device, the proximity of the target antenna (e.g. the distance between the antenna of the conventional NFC device and the target antenna of another device), and the NFC antenna matching network of the conventional NFC device, some problems may occur. For example, the designer of the conventional NFC device may have designed the conventional NFC device based upon a wrong assumption of the proximity of the target antenna, causing the performance of the conventional NFC device to become unacceptable to the user in some situations. In another example, the manufacturer of the conventional NFC device may need to manually adjust the conventional NFC device for different target value of the modulation index, causing the associated costs such as additional labor costs of manually adjusting the conventional NFC device to be irreducible. In another example, as the modulation index depends on the antenna impedance, and as the antenna impedance is typically sensitive to the environment that shifts its resonance frequency due to magnetic field coupling, in a situation where a metallic surface, a secondary antenna in close proximity, etc. change the antenna impedance drastically, the performance of the conventional NFC device may become unacceptable to the user. Thus, a novel method is required for improving the modulation index control of the NFC device in various kinds of situations.

SUMMARY

It is an objective of the claimed invention to provide a method for controlling a modulation index of a near field communication (NFC) device, and to provide an associated apparatus, in order to solve the above-mentioned problems.

It is another objective of the claimed invention to provide a method for controlling a modulation index of an NFC device, and to an associated apparatus, in order to enhance the performance by performing dynamic modulation index calibration.

According to at least one preferred embodiment, a method for controlling a modulation index of an NFC device is provided, where the method comprises: in a calibration mode of the NFC device, temporarily coupling a receiver of the NFC device to a transmitter of the NFC device to form a probing path between the receiver and the transmitter; and in the calibration mode of the NFC device, dynamically adjusting at least one portion of a plurality of modulation parameters corresponding to the modulation index according to probed results of outputs of the transmitter, in order to calibrate the modulation index, for use of transmitting through the transmitter in a normal mode of the NFC device.

According to at least one preferred embodiment, an apparatus for controlling a modulation index of an NFC device is provided, where the apparatus comprises at least one portion of the NFC device. The apparatus comprises a transmitter, a receiver, and a control circuit, where the transmitter, the receiver, and the control circuit are positioned within a chip of the NFC device, and the control circuit is coupled to the transmitter and the receiver. The transmitter is arranged to transmit data for the NFC device, and the receiver is arranged to receive data for the NFC device. In addition, in a calibration mode of the NFC device, the receiver is temporarily coupled to the transmitter to form a probing path between the receiver and the transmitter. Additionally, the control circuit is arranged to control operations of the NFC device, wherein in the calibration mode of the NFC device, the control circuit dynamically adjusts at least one portion of a plurality of modulation parameters corresponding to the modulation index according to probed results of outputs of the transmitter, in order to calibrate the modulation index, for use of transmitting through the transmitter in a normal mode of the NFC device.

It is an advantage of the present invention that the present invention method and apparatus can dynamically tune the modulation index at any time, for example, the modulation index calibration can be triggered any time either upon power on or by software sequence. In addition, in comparison to the related art, the present invention method and apparatus can reduce the related costs since changing the design of the NFC device in response to the change of the antenna size or shape is not required. Additionally, as the modulation index tuning of the present invention method and apparatus can be performed adaptively, the performance for each data rate can be optimized.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
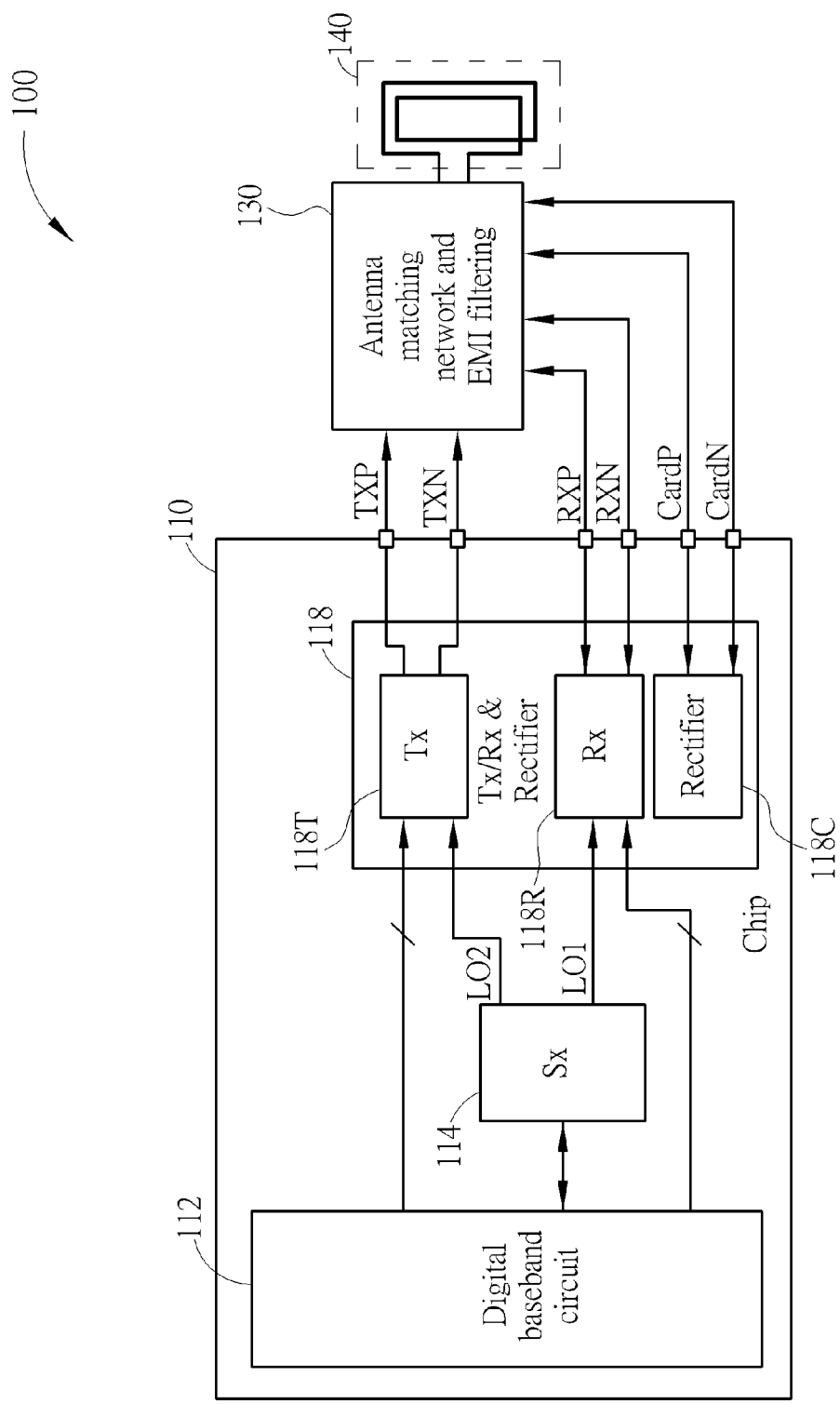
FIG. 1 is a diagram of an apparatus for controlling a modulation index of a near field communication (NFC) device according to a first embodiment of the present invention.

Please refer to FIG. 1, which illustrates a diagram of an apparatus 100 for controlling a modulation index of a near field communication (NFC) device according to a first embodiment of the present invention, where the apparatus 100 may comprise at least one portion (e.g. a portion or all) of the NFC device. For example, the apparatus 100 may comprise a portion of the NFC device mentioned above, and more particularly, can be at least one hardware circuit such as at least one integrated circuit (IC) within the NFC device. In another example, the apparatus 100 can be the whole of the NFC device mentioned above. In another example, the apparatus 100 may comprise an NFC system comprising the NFC device mentioned above.

As shown in FIG. 1, the apparatus 100 may comprise a chip 110, which can be taken as an example of the aforementioned at least one IC, and may further comprise an antenna matching network and electromagnetic interference (EMI) filtering module 130 (labeled "Antenna matching network and EMI filtering" in FIG. 1, for brevity) and an NFC antenna 140, where the antenna matching network and EMI filtering module 130 may comprise an antenna matching network and an EMI filter (which are not illustrated, for brevity). In practice, the EMI filter mentioned above can be implemented with some impedance components (e.g. one or more inductors and/or one or more capacitors, in this embodiment), and the antenna matching network mentioned above can be implemented with some impedance components (e.g. one or more inductors and/or one or more capacitors, in this embodiment). In addition, the chip 110 may comprise a control circuit such as a digital baseband circuit 112, and may comprise a serving module 114 (labeled "Sx" in FIG. 1, for brevity). The control circuit such as a digital baseband circuit 112 is arranged to control operations of the NFC device. Additionally, the chip 110 may further comprise a transceiver and rectifier module 118 (labeled "Tx/Rx & Rectifier" in FIG. 1, for brevity). For example, the transceiver and rectifier module 118 may comprise a transmitter 118T (labeled "Tx" in FIG. 1, for brevity), a receiver 118R (labeled "Rx" in FIG. 1, for brevity), and a rectifier 118C. When needed, the serving module 114 is capable of providing the transmitter 118T and the receiver 118R with a signal LO2 having a frequency (e.g. 13.56 MHz) and a signal LO1 having another frequency (e.g. 12.05 MHz), respectively. As shown in FIG. 1, the transmitter 118T can be coupled to a set of transmitter terminals TXP and TXN of the chip 110, where the transmitter 118T is arranged to transmit data for the NFC device through the set of transmitter terminals TXP and TXN, the antenna matching network and EMI filtering module 130, and the NFC antenna 140. The receiver 118R can be coupled to a set of receiver terminals RXP and RXN of the chip 110, where the receiver 118R is arranged to receive data for the NFC device through the set of receiver terminals RXP and RXN, the antenna matching network and EMI filtering module 130, and the NFC antenna 140. The rectifier 118C can be coupled to a set of card terminals CardP and CardN of the chip 110, where the rectifier 118C is arranged to perform rectifying, energy harvesting and passive load modulation operations for the NFC device through the set of card terminals CardP and CardN.

As shown in FIG. 1, the signals LO1 and LO2 are illustrated for better comprehension. This is for illustrative purposes only, and is not meant to be a limitation of the present invention. According to some variations of this embodiment, the architecture of the apparatus 100 is not limited to utilize a specific type of receivers such as direct-conversion receivers. For example, another type of receivers such as direct sampling receivers can be utilized in the architecture of the apparatus 100 in some of these variations, and other types of receivers can be utilized in the architecture of the apparatus 100 in others of these variations.

Figure 2:
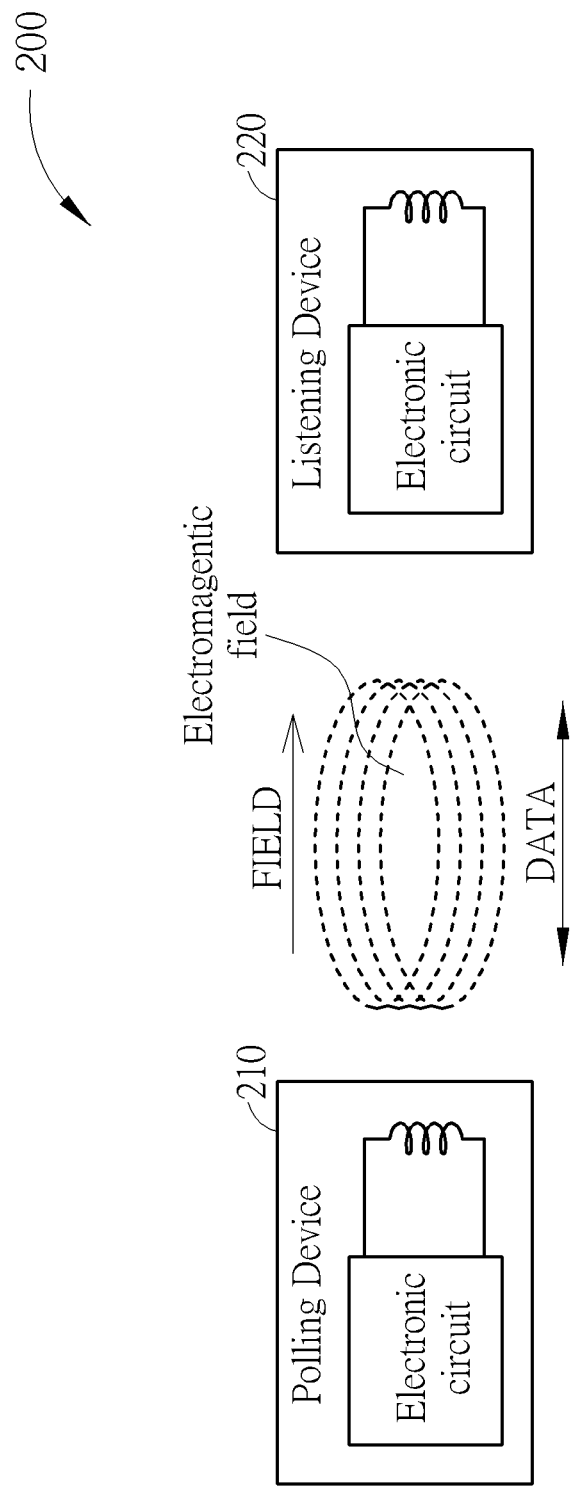
FIG. 2 illustrates an NFC system comprising the aforementioned NFC device of the embodiment shown in FIG. 1 according to an embodiment of the present invention.

FIG. 2 illustrates an NFC system 200 comprising the aforementioned NFC device of the embodiment shown in FIG. 1 according to an embodiment of the present invention, where the polling device 210 and the listening device 220 may represent two NFC terminals of the NFC system 200. As shown in FIG. 2, the polling device 210 and the listening device 220 may have their own electronic circuits, respectively, and may have their own NFC antennas.

For better comprehension, the listening device 220 can be taken as an example of the NFC device mentioned above, and the polling device 210 can be taken as an example of the other device in the embodiment shown in FIG. 1. According to this embodiment, the NFC system 200 may transmit data in different data rates between the aforementioned two NFC terminals such as the polling device 210 and the listening device 220. For example, the polling device 210 can be an NFC reader and the listening device 220 can be a passive tag or card. As the listening device 220 may need to operate in the absence of battery power, the listening device 220 can be designed to harvest energy from the incoming field (labeled "FIELD" in FIG. 2) such as at least one portion of the electromagnetic field.

With aid of using the architecture shown in FIG. 1, in a situation where the modulation index can be dynamically adjusted, and more particularly, can be calibrated to be suitable for the environment of the NFC system 200, the related art problems can be resolved.

Figure 3:
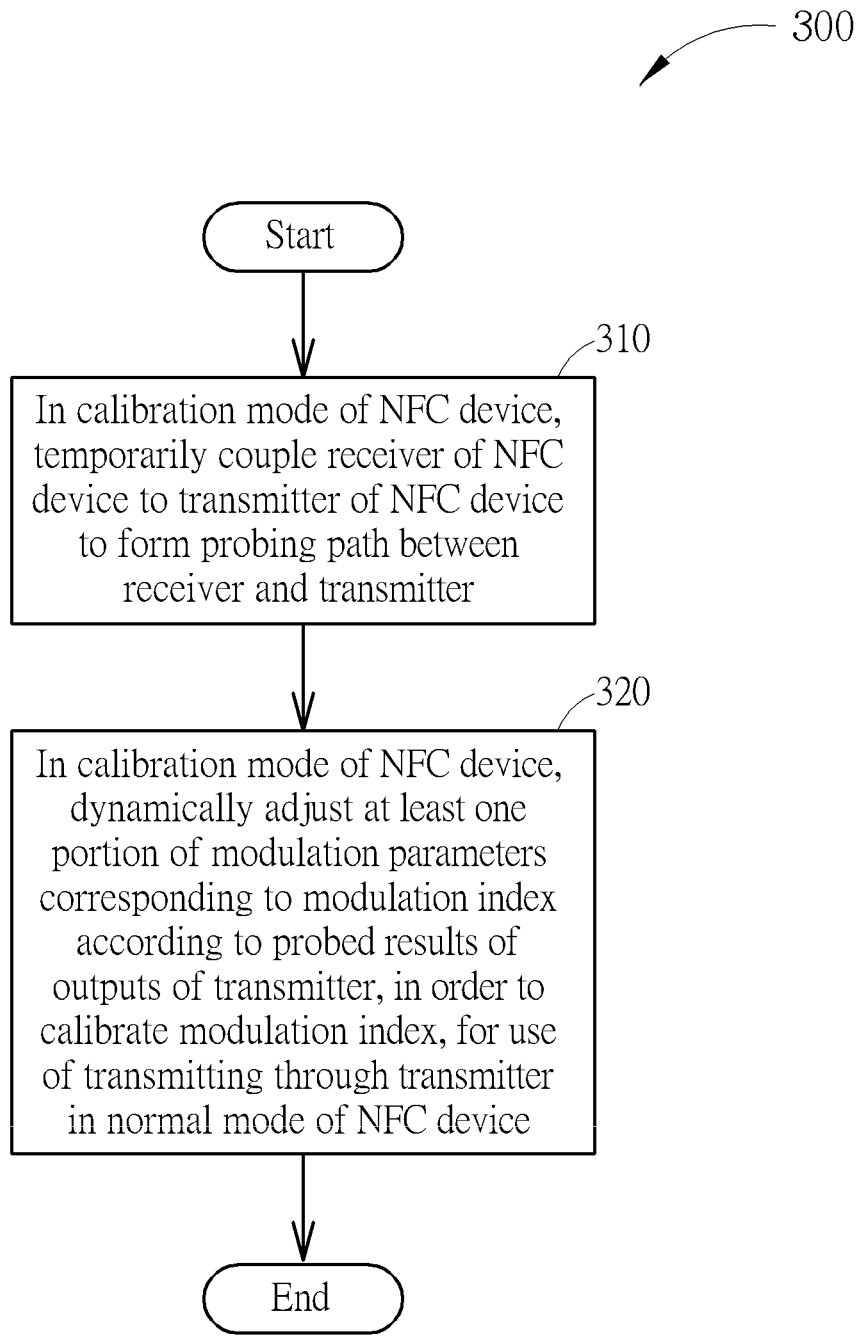
FIG. 3 illustrates a flowchart of a method for controlling a modulation index of an NFC device according to an embodiment of the present invention.

FIG. 3 illustrates a flowchart of a method 300 for controlling a modulation index of an NFC device according to an embodiment of the present invention. The method 300 shown in FIG. 3 can be applied to the apparatus 100 shown in FIG. 1, and more particularly, can be applied to the chip 110 shown in FIG. 1. The method is described as follows.

In Step 310, in a calibration mode of the NFC device, the receiver 118R is temporarily coupled to the transmitter 118T to form a probing path between the receiver 118R and the transmitter 118T. For example, a switching unit may be installed on the probing path, for selectively activating or deactivating the probing path, and the digital baseband circuit 112 may temporarily couple the receiver 118R to the transmitter 118T by turning on the switching unit to activate the probing path. This is for illustrative purposes only, and is not meant to be a limitation of the present invention. In another example, it is unnecessary to install the switching unit mentioned above, where the receiver 118R is coupled to the transmitter 118T to form the probing path between the receiver 118R and the transmitter 118T.

In Step 320, in the calibration mode of the NFC device, the digital baseband circuit 112 dynamically adjusts at least one portion of a plurality of modulation parameters corresponding to the modulation index according to the probed results of the outputs of the transmitter 118T, in order to calibrate the modulation index, for use of transmitting through the transmitter 118T in a normal mode of the NFC device. Typically, the digital baseband circuit 112 turns on both of the receiver 118R and the transmitter 118T, and some calibration operations may be performed in the calibration mode.

More particularly, the serving module 114, which is positioned within the chip 110 of the NFC device and coupled to the digital baseband circuit 112 and both of the transmitter 118T and the receiver 118R, is arranged to provide the transmitter 118T with a first signal having a first frequency (e.g. the signal LO2 having the frequency of 13.56 MHz) in the calibration mode of the NFC device, and to provide the receiver 118R with a second signal having a second frequency (e.g. the signal LO1 having the frequency of 12.05 MHz) in the calibration mode of the NFC device, allowing the receiver 118R to extract intermediate frequency (IF) signals from the probed results, for use of calibrating the modulation index, where the first frequency is a frequency of a carrier for data transmission through the transmitter 118T in the normal mode of the NFC device, and the second frequency is different from the first frequency.

Figure 4:
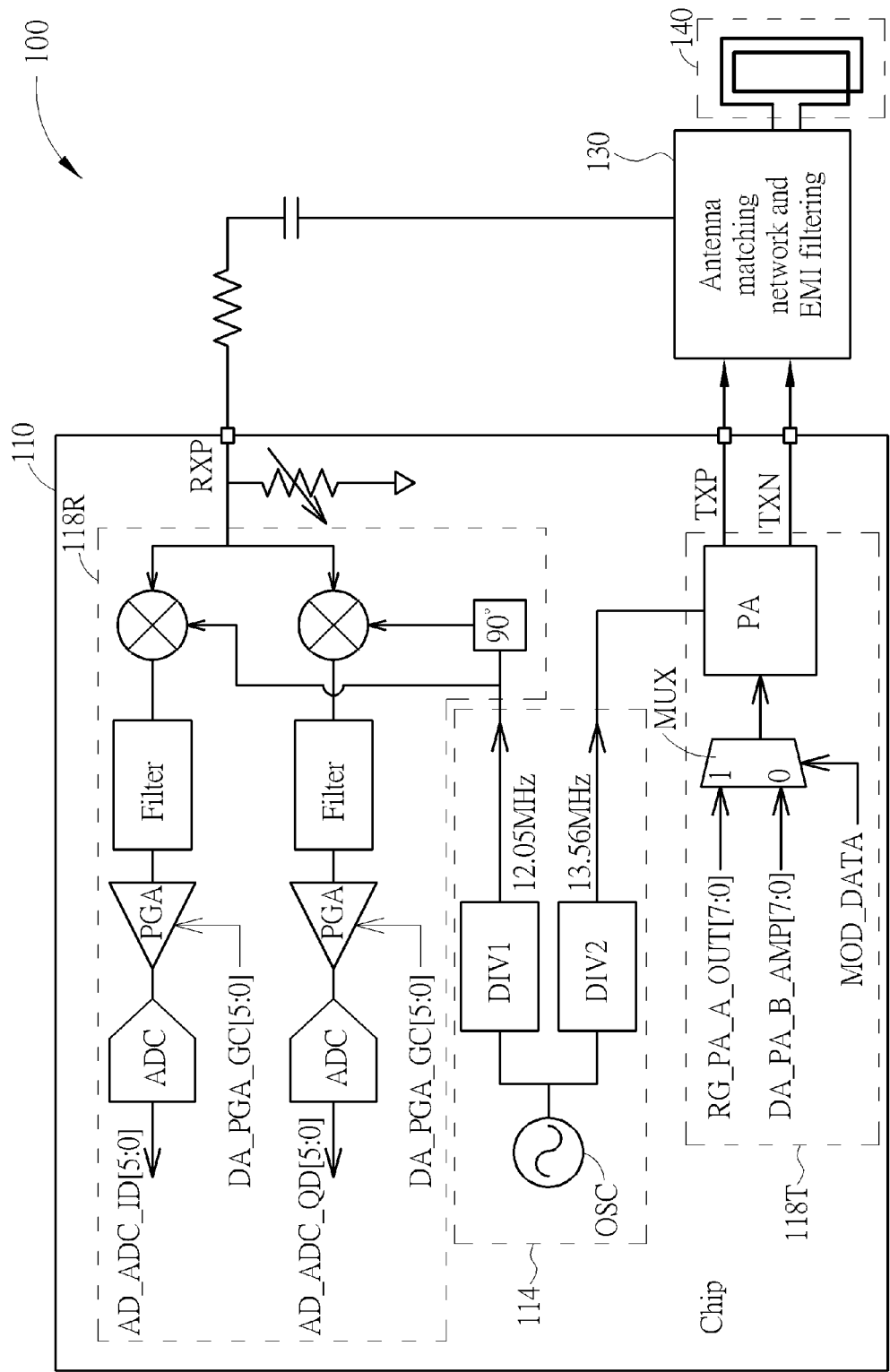
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention. As shown in FIG. 4, the serving module 114 of this embodiment may comprise an oscillator (labeled "OSC" in FIG. 4, for brevity) and a set of frequency dividers (labeled "DIV1" and "DIV2" in FIG. 4, for brevity). The set of frequency dividers can be utilized for performing frequency dividing operations on the output of the oscillator to generate the first signal mentioned above (e.g. the signal LO2 having the frequency of 13.56 MHz) and the second signal mentioned above (e.g. the signal LO1 having the frequency of 12.05 MHz). In this embodiment, the receiver 118R is coupled to the transmitter 118T through at least one impedance component to form the probing path between the receiver 118R and the transmitter 118T. For example, the aforementioned at least one impedance component may comprise the resistor and the capacitor illustrated around the upper right of FIG. 4. More particularly, one of the set of receiver terminals RXP and RXN, such as the receiver terminal RXP shown in FIG. 4, is temporarily coupled to one of the set of transmitter terminals TXP and TXN of the transmitter 118T (e.g. the transmitter terminal TXP shown in FIG. 4) through the antenna matching network and EMI filtering module 130 to form the probing path between the receiver 118R and the transmitter 118T, where the probed results can be received by the receiver 118R through the aforementioned one of the set of receiver terminals RXP and RXN, such as the receiver terminal RXP shown in FIG. 4.

According to this embodiment, the receiver 118R may comprise a first conversion unit and a second conversion unit, where the first conversion unit is arranged to, in the calibration mode of the NFC device, convert the probed results received through the aforementioned one of the set of receiver terminals RXP and RXN according to the second signal to generate a first portion of the intermediate signals, and the second conversion unit is arranged to, in the calibration mode of the NFC device, convert the probed results received through the aforementioned one of the set of receiver terminals RXP and RXN according to a phase shifted signal of the second signal to generate a second portion of the intermediate signals. More particularly, the first conversion unit and the second conversion unit can be a first mixer and a second mixer (which are illustrated around the upper right and the lower right of the receiver 118R shown in FIG. 4, respectively), and the receiver 118R may comprise a 90-degree phase shifting unit (labeled "90°" in FIG. 4, for brevity), and may further comprise a set of filters respectively coupled to the output terminals of the first mixer and the second mixer, a set of programmable-gain amplifiers (PGAs) respectively coupled to the output terminals of the set of filters, and a set of analog-to-digital converters (ADCs) respectively coupled to the output terminals of the set of PGAs. For example, in the calibration mode of the NFC device, the first mixer is arranged to mix the probed results received through the aforementioned one of the set of receiver terminals RXP and RXN, such as the receiver terminal RXP shown in FIG. 4, with the second signal (e.g. the signal LO1 having the frequency of 12.05 MHz) to generate the aforementioned first portion of the intermediate signals. In addition, in the calibration mode of the NFC device, the second mixer is arranged to mix the probed results received through the aforementioned one of the set of receiver terminals RXP and RXN, such as the receiver terminal RXP shown in FIG. 4, with the phase shifted signal of the second signal mentioned above (e.g. the phase shifted signal of the signal LO1 having the frequency of 12.05 MHz) to generate the aforementioned second portion of the intermediate signals, where the phase shifted signal in this embodiment can be a 90-degree phase shifted signal generated from the 90-degree phase shifting unit. In practice, the set of filters can be utilized for filtering the intermediate signals mentioned above, where the filtered results of the intermediate signals are input into the set of PGAs. The set of PGAs can be utilized for amplifying the filtered results of the intermediate signals according to a gain control parameter DA_PGA_GC[5:0] of the set of PGAs of the receiver 118R, with the gain of any of the set of PGAs corresponding to the control parameter DA_PGA_GC[5:0]. The set of ADCs can be utilized for performing analog-to-digital conversion operations on the amplified results output from the set of PGAs (i.e. the amplified results of the filtered results of the intermediate signals) to generate digital outputs AD_ADC_ID[5:0] and AD_ADC_QD[5:0] corresponding to the I-channel and the Q-channel, respectively.

Please note that, in the embodiment shown in FIG. 4, some details of the receiver 118R are illustrated for better comprehension. This is for illustrative purposes only, and is not meant to be a limitation of the present invention. According to some variations of this embodiment, the architecture of the apparatus 100 is not limited to utilize a specific type of receivers such as direct-conversion receivers. For example, another type of receivers such as direct sampling receivers can be utilized in the architecture of the apparatus 100 in some of these variations, and other types of receivers can be utilized in the architecture of the apparatus 100 in others of these variations.

As shown in FIG. 4, the transmitter 118T may comprise a multiplexer (labeled "MUX" in FIG. 4, for brevity), and may further comprise a power amplifier (labeled "PA" in FIG. 4, for brevity). The multiplexer is arranged to multiplex the aforementioned modulation parameters such as the modulation parameters RG_PA_A_OUT[7:0] and DA_PA_B_OUT[7:0] according to a modulation data signal MOD_DATA in any of the calibration mode and the normal mode, where the modulation data signal MOD_DATA is utilized for carrying data in the normal mode. Based on the first signal mentioned above (e.g. the signal LO2 having the frequency of 13.56

MHz), the power amplifier is arranged to generate the outputs of the transmitter 118T (i.e. the outputs mentioned in Step 320, such as a set of differential outputs in this embodiment) according to the multiplexed result output from the multiplexer. For example, in a situation where the multiplexed result is the modulation parameter RG_PA_A_OUT[7:0], the amplitude of the outputs of the transmitter 118T corresponds to the modulation parameter RG_PA_A_OUT[7:0], where the frequency of the outputs of the transmitter 118T is equivalent to that of the first signal mentioned above (e.g. 13.56 MHz). In another example, in a situation where the multiplexed result is the modulation parameter DA_PA_B_OUT [7:0], the amplitude of the outputs of the transmitter 118T corresponds to the modulation parameter DA_PA_B_OUT [7:0], where the frequency of the outputs of the transmitter 118T is equivalent to that of the first signal mentioned above (e.g. 13.56 MHz).

Figure 5:
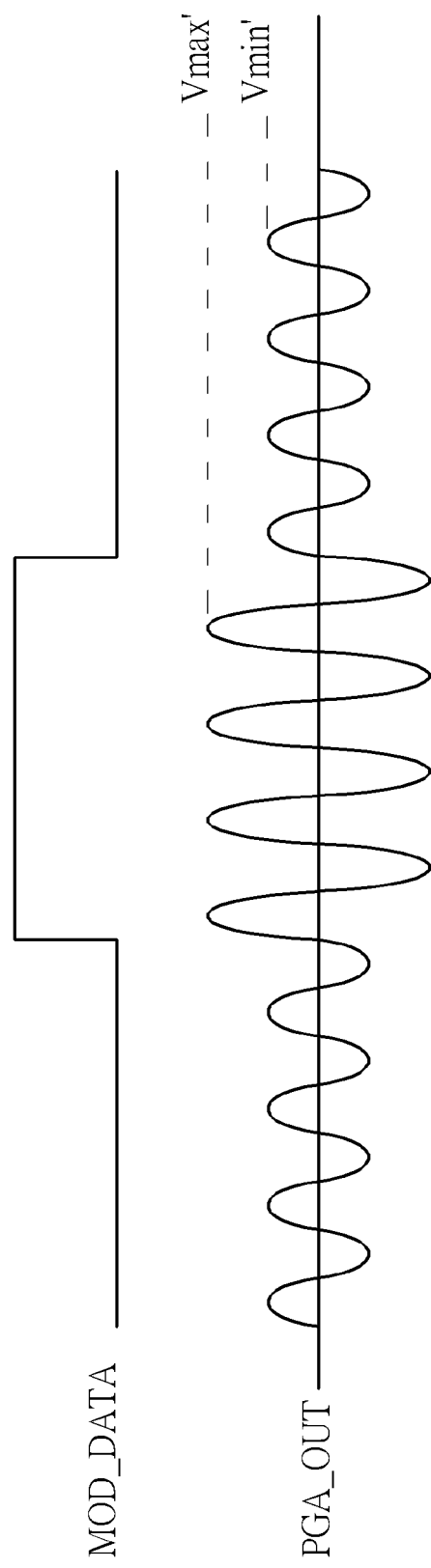
FIG. 5 illustrates some associated signals involved with the method shown in FIG. 3 according to an embodiment of the present invention.

FIG. 5 illustrates some associated signals involved with the method 300 shown in FIG. 3 according to an embodiment of the present invention. Please note that the output signals obtained from the output terminals of the set of PGAs mentioned above can be regarded as a set of differential outputs, and the PGA output signal PGA_OUT shown in FIG. 5 may represents the voltage difference between the output terminals of the set of PGAs.

In this embodiment, the modulation data signal MOD_DATA may correspond to a logical value 0 or a logical value 1, where the lower level of the two voltage levels of the modulation data signal MOD_DATA shown in FIG. 5 indicates the logical value 0, and the higher level of the two voltage levels of the modulation data signal MOD_DATA shown in FIG. 5 indicates the logical value 1. For example, in a situation where the modulation data signal MOD_DATA corresponds to the logical value 1, the multiplexed result is the modulation parameter RG_PA_A_OUT[7:0], and the amplitude Vmax of the outputs of the transmitter 118T corresponds to the modulation parameter RG_PA_A_OUT[7:0]. More particularly, in the calibration mode, with the amplitude Vmax of the outputs of the transmitter 118T corresponding to the modulation parameter RG_PA_A_OUT[7:0], the amplitude Vmax' of the PGA output signal PGA_OUT output from the set of PGAs mentioned above can be detected, where the ratio of the amplitude Vmax' of the PGA output signal PGA_OUT to the amplitude Vmax of the outputs of the transmitter 118T can be adjusted by tuning the control parameter DA_PGA_GC[5:0] mentioned above. In another example, in a situation where the modulation data signal MOD_DATA corresponds to the logical value 0, the multiplexed result is the modulation parameter DA_PA_B_OUT [7:0], and the amplitude Vmin of the outputs of the transmitter 118T corresponds to the modulation parameter DA_PA_B_OUT[7:0]. More particularly, in the calibration mode, with the amplitude Vmin of the outputs of the transmitter 118T corresponding to the modulation parameter DA_PA_B_OUT[7:0], the amplitude Vmin' of the PGA output signal PGA_OUT output from the set of PGAs mentioned above can be detected, where the ratio of the amplitude Vmin' of the PGA output signal PGA_OUT to the amplitude Vmin of the outputs of the transmitter 118T can be adjusted by tuning the control parameter DA_PGA_GC[5:0] mentioned above. This is for illustrative purposes only, and is not meant to be a limitation of the present invention. According to some variations of this embodiment, the architecture may be varied, where the PGA gain can be adjusted so that the signal falls within the ADC dynamic range. In practice, in the calibration mode, the digital baseband circuit 112 is capable of tuning the control parameter DA_PGA_GC[5:0] to calibrate the ratio of the amplitude Vmax' to the amplitude Vmax or the ratio of the amplitude Vmin' to the amplitude Vmin, in order to calibrate the aforementioned modulation index, which can be expressed as follows:

$$m=(V\text{max}-V\text{min})/(V\text{max}+V\text{min});$$

where the notation "m" may represent the modulation index.

According to this embodiment, in the calibration mode of the NFC device, the digital baseband circuit 112 may temporarily sets the modulation data signal MOD_DATA to correspond to the logical value 1, and sets a first modulation parameter of the modulation parameters RG_PA_A_OUT[7:0] and DA_PA_B_OUT[7:0] to be equivalent to a specific value, in order to calibrate the gain control parameter DA_PGA_GC [5:0] of the set of PGAs of the receiver 118R. This is for illustrative purposes only, and is not meant to be a limitation of the present invention. According to some variations of this embodiment, the architecture may be varied, where the PGA gain can be adjusted so that the signal falls within the ADC dynamic range. More particularly, the first modulation parameter is utilized for controlling the maximum voltage of the envelope of the outputs of the transmitter 118T (e.g. the amplitude Vmax) in any of the calibration mode and the normal mode, where the modulation parameter RG_PA_A_OUT[7:0] can be taken as an example of the first modulation parameter mentioned above.

In addition, in the calibration mode of the NFC device, after the calibration of the gain control parameter DA_PGA_GC[5:0] is completed, the digital baseband circuit 112 may calculate an average of some detection values of the maximum voltage mentioned above (e.g. the average of some detection values of the amplitude Vmax, such as the amplitude Vmax'), where the detection values are obtained based on a portion of a plurality of digitized values of the PGA outputs of the set of PGAs. For example, in a situation where the digital outputs AD_ADC_ID[5:0] and AD_ADC_QD[5:0] carry the plurality of digitized values mentioned above, the digital baseband circuit 112 may average some of the digitized values carried by the digital outputs AD_ADC_ID[5:0] and AD_ADC_QD[5:0] to obtain the average mentioned above. The digital baseband circuit 112 may further calculate a target detection value of the minimum voltage of the envelope of the outputs of the transmitter 118T (e.g. the target detection value of the amplitude Vmin, such as the target value of the amplitude Vmin') according to the average and according to a target value of the modulation index m. For example, the target value of the modulation index m can be equivalent to 10% based on NFC standards. In another example, the target value of the modulation index m can be equivalent to 30% based on NFC standards. This is for illustrative purposes only, and is not meant to be a limitation of the present invention. In another example, the target value of the modulation index m can be equivalent to another value. No matter whether the target value of the modulation index m is equivalent to 10% or 30% or another value, after the target detection value of the minimum voltage mentioned above (e.g. the target detection value of the amplitude Vmin, such as the target value of the amplitude Vmin') is calculated, the digital baseband circuit 112 may temporarily set the modulation data signal MOD_DATA to correspond to the logical value 0, in order to calibrate a second modulation parameter of the modulation parameters RG_PA_A_OUT[7:0] and DA_PA_B_OUT[7:0] according to the target detection value of the minimum voltage. More particularly, the second modulation parameter is utilized for controlling the minimum voltage of the envelope of the outputs of the transmitter 118T (e.g. the amplitude Vmin) in any of the calibration mode and the normal mode, where the modulation parameter DA_PA_B_OUT[7:0] can be taken as an example of the second modulation parameter mentioned above.

Additionally, the digital baseband circuit 112 may dynamically adjust the second modulation parameter (e.g. the modulation parameter DA_PA_B_OUT[7:0]), in order to complete calibrating the modulation index m. For example, the digital baseband circuit 112 may dynamically adjust the second modulation parameter (e.g. the modulation parameter DA_PA_B_OUT[7:0]) until one detection value of the minimum voltage is equivalent to the target detection value mentioned above, where the aforementioned one detection value is obtained based on another portion of the plurality of digitized values of the PGA outputs of the set of PGAs. This is for illustrative purposes only, and is not meant to be a limitation of the present invention. According to some variations of this embodiment, the digital baseband circuit 112 may dynamically adjust the second modulation parameter (e.g. the modulation parameter DA_PA_B_OUT[7:0]) until the aforementioned one detection value of the minimum voltage is substantially closest to the target detection value. More particularly, the digital baseband circuit 112 may dynamically adjust the second modulation parameter (e.g. the modulation parameter DA_PA_B_OUT[7:0]) until the difference between the aforementioned one detection value falls within the range of a predetermined interval comprising the target detection value. For example, the notation mag_vmin_tgt may represent the target detection value, and the predetermined interval can be [mag_vmin_tgt−Δ, mag_vmin_tgt+Δ], where the notation Δ may represent the predetermined tolerance of the target detection value mag_vmin_tgt. According to some other variations of this embodiment, the aforementioned one detection value of the minimum voltage may be extended to be at least one detection value (e.g. one or more detection values) of the minimum voltage to guarantee the correctness of the calibration in some situations, where the aforementioned at least one detection value is obtained based on the other portion of the plurality of digitized values of the PGA outputs of the set of PGAs. According to some other variations of this embodiment, the digital baseband circuit 112 may dynamically adjust the second modulation parameter (e.g. the modulation parameter DA_PA_B_OUT[7:0]) until the aforementioned at least one detection value (e.g. the aforementioned one or more detection values) is substantially closest to the target detection value. More particularly, the digital baseband circuit 112 may dynamically adjust the second modulation parameter (e.g. the modulation parameter DA_PA_B_OUT[7:0]) until the difference between the aforementioned at least one detection value falls within the range of the predetermined interval comprising the target detection value.

In practice, in the calibration mode of the NFC device, after the gain control parameter DA_PGA_GC[5:0] is calibrated, the gain control parameter DA_PGA_GC[5:0] is not varied. In addition, the probed results of the outputs of the transmitter 118T are typically obtained through the probing path mentioned above.

In some embodiments of the present invention, such as some variations of this embodiment, the probing path is not activated in the normal mode of the NFC device. This is for illustrative purposes only, and is not meant to be a limitation of the present invention.

Figure 6:
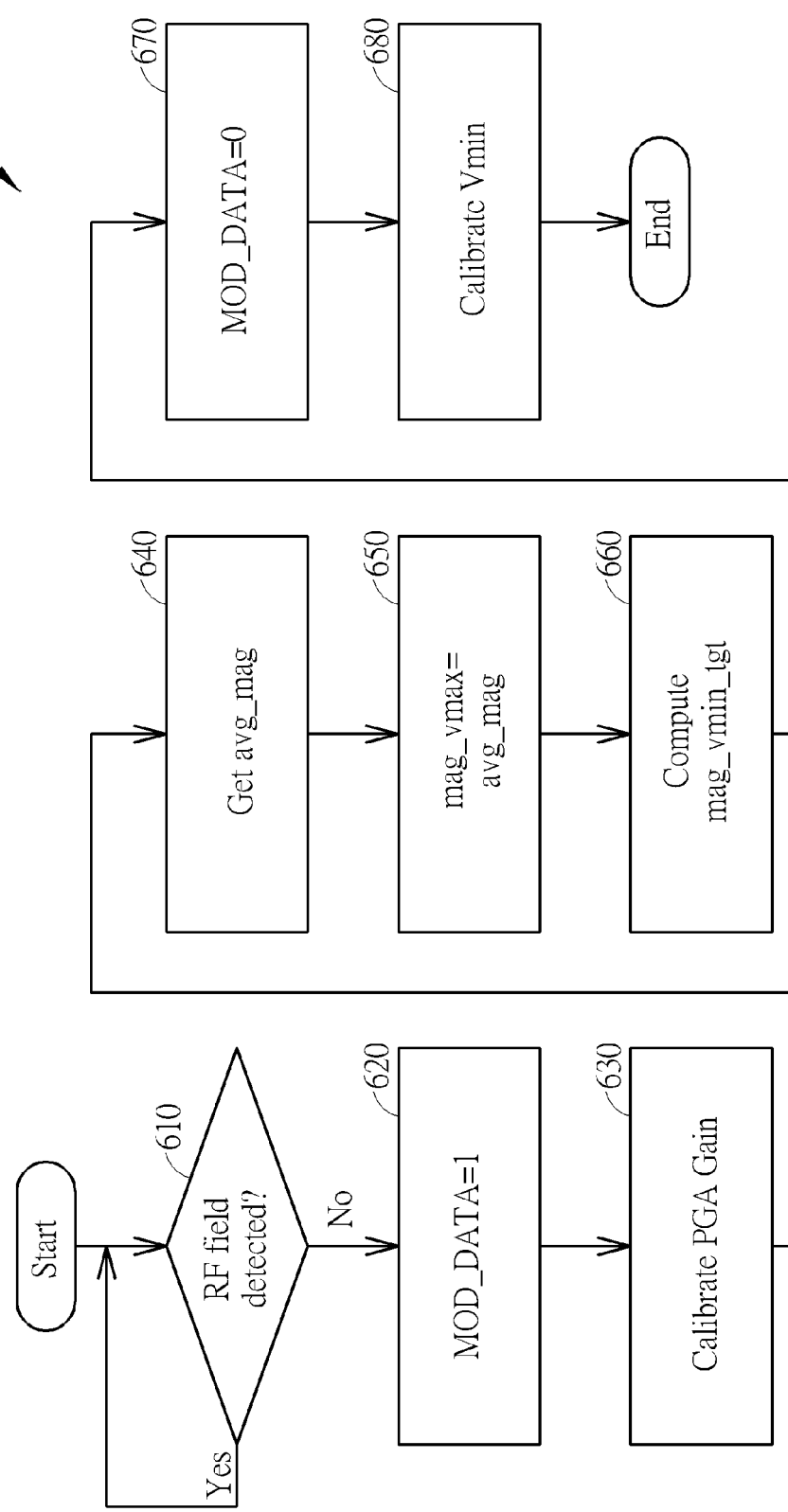
FIG. 6 illustrates a working flow involved with the method shown in FIG. 3 according to an embodiment of the present invention.

FIG. 6 illustrates a working flow 600 involved with the method 300 shown in FIG. 3 according to an embodiment of the present invention.

In Step 610, the digital baseband circuit 112 checks whether any radio frequency (RF) field exists around the NFC device (labeled "RF field detected" in FIG. 6, for better comprehension). More particularly, under control of the digital baseband circuit 112, the NFC device detects if there is a field or not, where the airways must be clear of any field before calibration starts, and if there is no field, then calibration operations can be performed. When it is detected that the RF field exists, Step 610 is re-entered; otherwise, Step 620 is entered.

In Step 620, the digital baseband circuit 112 sets the modulation data signal MOD_DATA to correspond to the logical value 1 (labeled "MOD_DATA=1" in FIG. 6, for brevity).

In Step 630, the digital baseband circuit 112 calibrates the gain control parameter DA_PGA_GC[5:0] (labeled "PGA Gain" in FIG. 6, for brevity). As a result, the digital baseband circuit 112 controls the gain control parameter DA_PGA_GC[5:0] to be a certain value to guarantee that the amplitude Vmin' mentioned above can be properly detected. This is for illustrative purposes only, and is not meant to be a limitation of the present invention. According to some variations of this embodiment, the architecture may be varied, where the receiver gain (or the Rx gain, such as the PGA gain mentioned above) can be adjusted so that the received signal falls within the ADC dynamic range. For the best overall calibration performance in this embodiment, the digital baseband circuit 112 does not further vary the gain control parameter DA_PGA_GC[5:0] in the following steps of the working flow 600.

In Step 640, the digital baseband circuit 112 obtains gets the average magnitude avg_mag, which can be taken as an example of the average mentioned in the embodiment shown in FIG. 5. More particularly, the digital baseband circuit 112 obtains at least one portion of the plurality of digitized values of the PGA outputs of the set of PGAs from the digital outputs AD_ADC_ID[5:0] and AD_ADC_QD[5:0], and calculates the average magnitude avg_mag of the magnitude (or amplitude) of the waveform of the PGA output signal PGA_OUT.

In Step 650, the digital baseband circuit 112 sets the parameter mag_vmax to be equal to the average magnitude avg_mag (labeled "mag_vmax=avg_mag" in FIG. 6, for brevity), where the parameter mag_vmax represents the aforementioned amplitude Vmax' of the PGA output signal PGA_OUT output from the set of PGAs mentioned above.

In Step 660, the digital baseband circuit 112 computes the target detection value mag_vmin_tgt (e.g. the target detection value of the amplitude Vmin, such as the target value of the amplitude Vmin'). For example, the target detection value mag_vmin_tgt can be calculated according to the following equation:

$$mag\_vmin\_tgt=((1-m\_tgt)/(1+m\_tgt))*mag\_vmax;$$

where the notation m_tgt represents the target value of the modulation index m. For example, the target value m_tgt of the modulation index m can be equivalent to 10% based on NFC standards. In another example, the target value m_tgt of the modulation index m can be equivalent to 30% based on NFC standards. In another example, the target value m_tgt of the modulation index m can be equivalent to another value.

In Step 670, the digital baseband circuit 112 sets the modulation data signal MOD_DATA to correspond to the logical value 0 (labeled "MOD_DATA=0" in FIG. 6, for brevity).

In Step 680, the digital baseband circuit 112 calibrates the amplitude Vmin mentioned above by dynamically adjusting the second modulation parameter (e.g. the modulation parameter DA_PA_B_OUT[7:0]) and by using the target detection value mag_vmin_tgt as the target of the amplitude Vmin'. For example, the digital baseband circuit 112 may dynamically adjust the second modulation parameter (e.g. the modulation parameter DA_PA_B_OUT[7:0]) until the amplitude Vmin' reaches the target detection value mag_vmin_tgt. In another example, the digital baseband circuit 112 may dynamically adjust the second modulation parameter (e.g. the modulation parameter DA_PA_B_OUT[7:0]) until the amplitude Vmin' approaches the target detection value mag_vmin_tgt and falls with the range of the predetermined interval [mag_vmin_tgt−Δ, mag_vmin_tgt+Δ], where the notation Δ may represent the predetermined tolerance of the target detection value mag_vmin_tgt. As a result of completing the calibration of the amplitude Vmin, the modulation index m is properly calibrated, where the measurement results of the modulation index m should be equal to or very close to the target value m_tgt, and some experiments using real silicon chips indicate that the overall performance of the NFC device can be guaranteed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a modulation index of a near field communication (NFC) device, the method comprising:
   in a calibration mode of the NFC device, temporarily coupling a receiver of the NFC device to a transmitter of the NFC device to form a probing path between the receiver and the transmitter; and
   in the calibration mode of the NFC device, dynamically adjusting at least one portion of a plurality of modulation parameters corresponding to the modulation index according to probed results of outputs of the transmitter, in order to calibrate the modulation index, for use of transmitting through the transmitter in a normal mode of the NFC device.

2. The method of claim 1, further comprising:
   in the calibration mode of the NFC device, providing the transmitter with a first signal having a first frequency, wherein the first frequency is a frequency of a carrier for data transmission through the transmitter in the normal mode of the NFC device; and
   in the calibration mode of the NFC device, providing the receiver with a second signal having a second frequency, allowing the receiver to extract intermediate signals from the probed results, for use of calibrating the modulation index, wherein the second frequency is different from the first frequency.

3. The method of claim 2, wherein the receiver is coupled to a set of receiver terminals of the chip, and the transmitter is coupled to a set of transmitter terminals of the chip; and the step of temporarily coupling the receiver of the NFC device to the transmitter of the NFC device to form the probing path between the receiver and the transmitter further comprises:
   temporarily coupling one of the set of receiver terminals to one of the set of transmitter terminals of the transmitter to form the probing path between the receiver and the transmitter;
   wherein the probed results are received through the one of the set of receiver terminals.

4. The method of claim 3, further comprising:
   in the calibration mode of the NFC device, converting the probed results received through the one of the set of receiver terminals according to the second signal to generate a first portion of the intermediate signals; and
   in the calibration mode of the NFC device, converting the probed results received through the one of the set of receiver terminals according to a phase shifted signal of the second signal to generate a second portion of the intermediate signals.

5. The method of claim 1, wherein a multiplexer within the transmitter is utilized for multiplexing the modulation parameters according to a modulation data signal in any of the calibration mode and the normal mode; the modulation data signal is utilized for carrying data in the normal mode; and the step of dynamically adjusting the at least one portion of the plurality of modulation parameters corresponding to the modulation index according to the probed results of the outputs of the transmitter in order to calibrate the modulation index further comprises:
   in the calibration mode of the NFC device, temporarily setting the modulation data signal to correspond to a logical value 1, and setting a first modulation parameter of the modulation parameters to be equivalent to a specific value, in order to calibrate a gain control parameter of a set of programmable-gain amplifiers (PGAs) of the receiver, wherein the first modulation parameter is utilized for controlling a maximum voltage of an envelope of the outputs of the transmitter in any of the calibration mode and the normal mode;
   wherein a first portion of the intermediate signals and a second portion of the intermediate signals are input into the set of PGAs, respectively.

6. The method of claim 5, wherein the step of dynamically adjusting the at least one portion of the plurality of modulation parameters corresponding to the modulation index according to the probed results of the outputs of the transmitter in order to calibrate the modulation index further comprises:
   in the calibration mode of the NFC device, after calibration of the gain control parameter is completed, calculating an average of detection values of the maximum voltage, wherein the detection values are obtained based on a portion of a plurality of digitized values of PGA outputs of the set of PGAs;
   calculating a target detection value of a minimum voltage of the envelope of the outputs of the transmitter according to the average and according to a target value of the modulation index; and
   temporarily setting the modulation data signal to correspond to a logical value 0, in order to calibrate a second modulation parameter of the modulation parameters according to the target detection value of the minimum voltage, wherein the second modulation parameter is utilized for controlling the minimum voltage of the envelope of the outputs of the transmitter in any of the calibration mode and the normal mode.

7. The method of claim 6, wherein the step of calibrating the second modulation parameter of the modulation parameters according to the target detection value of the minimum voltage further comprises:
   dynamically adjusting the second modulation parameter until at least one detection value of the minimum voltage is substantially closest to the target detection value, wherein the at least one detection value is obtained based on another portion of the plurality of digitized values of the PGA outputs of the set of PGAs.

8. The method of claim 5, wherein in the calibration mode of the NFC device, after the gain control parameter is calibrated, the gain control parameter is not varied.

9. The method of claim 1, wherein the probing path is not activated in the normal mode of the NFC device.

10. The method of claim 1, wherein the probed results of the outputs of the transmitter are obtained through the probing path.

11. An apparatus for controlling a modulation index of a near field communication (NFC) device, the apparatus comprising at least one portion of the NFC device, the apparatus comprising:
- a transmitter, positioned within a chip of the NFC device, arranged to transmit data for the NFC device;
- a receiver, positioned within the chip of the NFC device, arranged to receive data for the NFC device, wherein in a calibration mode of the NFC device, the receiver is temporarily coupled to the transmitter to form a probing path between the receiver and the transmitter; and
- a control circuit, positioned within the chip of the NFC device and coupled to the transmitter and the receiver, arranged to control operations of the NFC device, wherein in the calibration mode of the NFC device, the control circuit dynamically adjusts at least one portion of a plurality of modulation parameters corresponding to the modulation index according to probed results of outputs of the transmitter, in order to calibrate the modulation index, for use of transmitting through the transmitter in a normal mode of the NFC device.

12. The apparatus of claim 11, further comprising:
- a serving module, positioned within the chip of the NFC device and coupled to the control circuit and both of the transmitter and the receiver, arranged to provide the transmitter with a first signal having a first frequency in the calibration mode of the NFC device, and to provide the receiver with a second signal having a second frequency in the calibration mode of the NFC device, allowing the receiver to extract intermediate signals from the probed results, for use of calibrating the modulation index, wherein the first frequency is a frequency of a carrier for data transmission through the transmitter in the normal mode of the NFC device, and the second frequency is different from the first frequency.

13. The apparatus of claim 12, wherein the receiver is coupled to a set of receiver terminals of the chip, and the transmitter is coupled to a set of transmitter terminals of the chip; one of the set of receiver terminals is temporarily coupled to one of the set of transmitter terminals of the transmitter to form the probing path between the receiver and the transmitter; and the probed results are received through the one of the set of receiver terminals.

14. The apparatus of claim 13, wherein the receiver comprises:
- a first conversion unit arranged to, in the calibration mode of the NFC device, convert the probed results received through the one of the set of receiver terminals according to the second signal to generate a first portion of the intermediate signals; and
- a second conversion unit arranged to, in the calibration mode of the NFC device, convert the probed results received through the one of the set of receiver terminals according to a phase shifted signal of the second signal to generate a second portion of the intermediate signals.

15. The apparatus of claim 11, wherein the transmitter comprises:
- a multiplexer arranged to multiplex the modulation parameters according to a modulation data signal in any of the calibration mode and the normal mode, wherein the modulation data signal is utilized for carrying data in the normal mode;

wherein in the calibration mode of the NFC device, the control circuit temporarily sets the modulation data signal to correspond to a logical value 1, and sets a first modulation parameter of the modulation parameters to be equivalent to a specific value, in order to calibrate a gain control parameter of a set of programmable-gain amplifiers (PGAs) of the receiver, wherein the first modulation parameter is utilized for controlling a maximum voltage of an envelope of the outputs of the transmitter in any of the calibration mode and the normal mode.

16. The apparatus of claim 15, wherein in the calibration mode of the NFC device, after calibration of the gain control parameter is completed, the control circuit calculates an average of detection values of the maximum voltage, wherein the detection values are obtained based on a portion of a plurality of digitized values of PGA outputs of the set of PGAs; the control circuit calculates a target detection value of a minimum voltage of the envelope of the outputs of the transmitter according to the average and according to a target value of the modulation index; and the control circuit temporarily sets the modulation data signal to correspond to a logical value 0, in order to calibrate a second modulation parameter of the modulation parameters according to the target detection value of the minimum voltage, wherein the second modulation parameter is utilized for controlling the minimum voltage of the envelope of the outputs of the transmitter in any of the calibration mode and the normal mode.

17. The apparatus of claim 16, wherein the control circuit dynamically adjusts the second modulation parameter until at least one detection value of the minimum voltage is substantially closest to the target detection value, wherein the at least one detection value is obtained based on another portion of the plurality of digitized values of the PGA outputs of the set of PGAs.

18. The apparatus of claim 15, wherein in the calibration mode of the NFC device, after the gain control parameter is calibrated, the gain control parameter is not varied.

19. The apparatus of claim 11, wherein the probing path is not activated in the normal mode of the NFC device.

20. The apparatus of claim 11, wherein the probed results of the outputs of the transmitter are obtained through the probing path.

* * * * *